US008155102B1

(12) United States Patent
Hakola et al.

(10) Patent No.: US 8,155,102 B1
(45) Date of Patent: Apr. 10, 2012

(54) CHANNEL ACCESS CONTROL

(75) Inventors: Sami-Jukka Hakola, Kempele (FI); Timo Koskela, Oulu (FI); Samuli Turtinen, Ii (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/114,418

(22) Filed: May 24, 2011

(51) Int. Cl.
*H04J 3/00* (2006.01)
*H04W 4/00* (2009.01)
(52) U.S. Cl. ........................ 370/345; 370/338
(58) Field of Classification Search .......... 370/338, 370/345
See application file for complete search history.

(56) References Cited

U.S. PATENT DOCUMENTS

| 7,826,838 | B1 | 11/2010 | Nanda et al. ............... 455/423 |
| 2002/0188750 | A1* | 12/2002 | Li ............................ 709/235 |
| 2003/0103521 | A1* | 6/2003 | Raphaeli et al. ........... 370/445 |
| 2005/0064817 | A1 | 3/2005 | Ginzburg ................... 455/41.2 |
| 2006/0056443 | A1* | 3/2006 | Tao et al. .................. 370/462 |
| 2006/0176813 | A1* | 8/2006 | Santhanankrishnan ..... 370/230 |
| 2009/0154353 | A1 | 6/2009 | Loiacono et al. .......... 370/235 |
| 2009/0303908 | A1* | 12/2009 | Deb et al. .................. 370/310 |
| 2010/0034091 | A1* | 2/2010 | Hiertz et al. ............... 370/236 |
| 2010/0157966 | A1* | 6/2010 | Sugar et al. ................ 370/338 |
| 2010/0254365 | A1* | 10/2010 | Benveniste ................ 370/338 |

OTHER PUBLICATIONS

"Distributed Coordination Function" from Wikipedia, 1 pg.
Wang, X., et al., "CSMA/CCA: A modified CSMA/CA Protocol Mitigating the Fairness Problem for IEEE 802.11 DCF", EURASIP Journal on Wireless Communication and Networking, vol. 2006, Article ID 39604, 13 pgs.
Abeysekera, et al., "Dynamic Contention Window Control Scheme in IEEE 802.11e Wireless LANs", (2009), (pp. 1-5).
Elhag, et al., "Adaptive Contention Window Scheme for. WLANs", Third International Arab Journal of Information Technology, vol. 4, No. 4, (Oct. 2007), (pp. 313-321).

* cited by examiner

*Primary Examiner* — Kenny Lin
(74) *Attorney, Agent, or Firm* — Harrington & Smith (57) ABSTRACT

There are provided measures for channel access control. Such measures may exemplarily include obtaining a contention window assignment including at least an assignment of a size of a contention window for contention-based channel access, accessing at least one logical channel in a contention-based manner according to the contention window assignment, including allocating resources to the at least one logical channel for data transmission, and modifying the size of the contention window based on a result of the resource allocation in terms of an aggregated bit rate allocated for data transmission and an aggregate target bit rate requirement of prioritized bit rates of the at least one logical channel.

13 Claims, 8 Drawing Sheets

CHANNEL ACCESS CONTROL

FIELD OF THE INVENTION

The present invention relates to channel access control. More specifically, the present invention relates to measures (including methods, apparatuses and computer program products) for channel access control.

BACKGROUND

In the field of wireless communication systems, resource allocation and resource sharing represent important issues. This is particularly due to the fact that a band (i.e. frequency spectrum), on which resources are available for a specific communication or system, and thus the resources are limited.

In the field of wireless communication systems, it may be differentiated between cellular communication networks typically utilizing scheduling-based channel access mechanisms on a licensed spectrum, and local area networks typically utilizing non-scheduled (contention-based) channel access mechanisms on an unlicensed spectrum.

In recent years, cooperation and interworking (also referred to as merging) of different types of networks and systems has received increasing attention. In this regard, efforts are made for realizing a combination of cellular communication networks and local area networks. Such combined system may for example be usable for accomplishing cellular offloading, wherein traffic is offloaded from a cellular communication network to a local area network (such as WLAN) so as to reduce the load on the cellular communication network, and network-controlled device-to-device (D2D) communication, wherein devices such as user equipments (UE) or terminals directly communicate with each other without involving a network entity such as a base station or access node of a cellular communication network. Insofar, a D2D communication may also serve for cellular offloading purpose (in addition to an uplink offloading communication between a device and an access point of a local area network). In both aforementioned cases, the cellular communication network, in particular an access node or base station thereof, exercises control in establishing and operating corresponding connections and/or transmissions between a device and an access point of a local area network and/or between two devices. Such control typically includes channel access, resource allocation and resource (spectrum) sharing.

For example, a system combination as mentioned above may relate to a LTE-based system utilizing unlicensed spectrum. As mentioned above, applications therein could include e.g. network-controlled D2D or cellular offloading operations, where primary control and configurations, like channel/bearer configurations, are carried out by the LTE network. In other words, higher layer operations and configurations are kept under network control to allow smooth transition between D2D or cellular offloading communication mode and normal cellular (LTE) communication mode, while lower level channel access procedures could be implemented in a non-controlled manner from the serving (LTE) network point of view. This could be realized by having the serving network, like LTE, operating on a licensed spectrum and network-configured D2D or cellular offloading operation taking place on an unlicensed spectrum, e.g. on ISM bands.

However, several problems could arise in such control including channel access, resource allocation and resource (spectrum) sharing, which is mainly due to the differences in usable spectrums and, accordingly, channel access and resource allocation/sharing mechanisms of the two combined network or system types.

While channel access and corresponding resource allocation/sharing control mechanisms are specified in a scheduling-based manner for cellular communication networks (such as LTE), corresponding control mechanisms applicable for local area networks are substantially different in typically being unscheduled or contention-based (also referred to as listen-before-talk (LBT) type mechanisms).

Accordingly, there is a problem in accomplishing channel access and corresponding resource allocation/sharing control mechanisms on an unlicensed spectrum in a manner appropriate for fulfilling the requirements of the corresponding control mechanisms of the higher layer cellular communication network when both such networks or systems are merged. In particular, pure sensing and declaring whether the channel is busy or available for the transmission, as typically used in local are networks, is not enough for such merged systems, e.g. for fulfilling the requirements of a QoS-oriented cellular type (e.g. LTE) system with multiple configured radio bearers and/or logical channels among communicating devices in D2D or cellular offloading connections/or transmissions. Namely, even if a cellular operator decides to offload traffic to an unlicensed band by way of a corresponding D2D or uplink communication, the operator may still want to offer certain QoS levels for the offloaded UE or UEs. Also, even if a cellular operator provides for network-controlled D2D on an unlicensed band in general, the operator may want to offer certain QoS levels for the D2D UEs.

In view thereof, there is a problem in how to take into account specific characteristics (of/from a cellular communication network) in medium access protocol (on an unlicensed band of/from a local area network).

Thus, there is a need to further improve channel access control.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising obtaining a contention window assignment including at least an assignment of a size of a contention window for contention-based channel access, accessing at least one logical channel in a contention-based manner according to the contention window assignment, including allocating resources to the at least one logical channel for data transmission, and modifying the size of the contention window based on a result of the resource allocation in terms of an aggregated bit rate allocated for data transmission and an aggregate target bit rate requirement of prioritized bit rates of the at least one logical channel.

For example, according to further developments or modifications thereof, the method may further comprise evaluating a relationship between a value indicative of the aggregated bit rate allocated for data transmission after the resource allocation and a value indicative of the aggregate target bit rate requirement, and the contention window size modification may comprise increasing the size of the contention window, if the values are evaluated to have a predetermined relationship, and decreasing the size of the contention window, if the values are evaluated to not have a predetermined relationship.

According to an exemplary aspect of the present invention, there is provided a method comprising providing, to at least one device involved in a data transmission, a contention window assignment including at least an assignment of a size of a contention window for contention-based channel access.

According to an exemplary aspect of the present invention, there is provided an apparatus comprising an interface configured for communication with at least another apparatus, and a processor configured to obtain, via the interface, a contention window assignment including at least an assignment of a size of a contention window for contention-based channel access, perform accessing at least one logical channel in a contention-based manner according to the contention window assignment, including allocating resources to the at least one logical channel for data transmission, and modify the size of the contention window based on a result of the resource allocation in terms of an aggregated bit rate allocated for data transmission and an aggregate target bit rate requirement of prioritized bit rates of the at least one logical channel.

For example, according to further developments or modifications thereof, the processor may be further configured to evaluate a relationship between a value indicative of the aggregated bit rate allocated for data transmission after the resource allocation and a value indicative of the aggregate target bit rate requirement, and the processor may be further configured to, for contention window size modification, increase the size of the contention window, if the values are evaluated to have a predetermined relationship, and decrease the size of the contention window, if the values are evaluated to not have a predetermined relationship.

According to an exemplary aspect of the present invention, there is provided an apparatus comprising an interface configured for communication with at least another apparatus, and a processor configured to provide, to at least one device involved in a data transmission via the interface, a contention window assignment including at least an assignment of a size of a contention window for contention-based channel access.

According to an exemplary aspect of the present invention, there is provided a computer program product comprising computer-executable components which, when the program is run on a computer, are configured to execute the method according to any one of the above-described aspects.

By way of exemplary embodiments of the present invention, there is provided channel access control. More specifically, by way of exemplary embodiments of the present invention, there are provided measures and mechanisms channel access control, e.g. resource sharing control for contention-based channel access.

Stated in other words, exemplary embodiments of the present invention provide for a channel access mechanism capable of allow (cellular) network-controlled and configured higher layer operation and contention-based (e.g. listen-before-talk type) channel access on an unlicensed band.

Thus, improvement is achieved by methods, devices and computer program products enabling channel access control.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are is described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. In particular, for the applicability of thus described exemplary aspects and embodiments, LTE- (including LTE-Advanced-) related cellular communication networks are used as non-limiting examples for a higher layer network operating on a licensed band, and WLAN- (including any IEEE802.11-) related local area networks are used as non-limiting examples for a lower layer network operating on an unlicensed band. As such, the description of exemplary aspects and embodiments given herein specifically refers to terminology which is directly related thereto. Such terminology is only used in the context of the presented non-limiting examples, and does naturally not limit the invention in any way. Rather, any other communication systems, bands, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for channel access control, e.g. resource sharing control for contention-based channel access.

Figure 1:
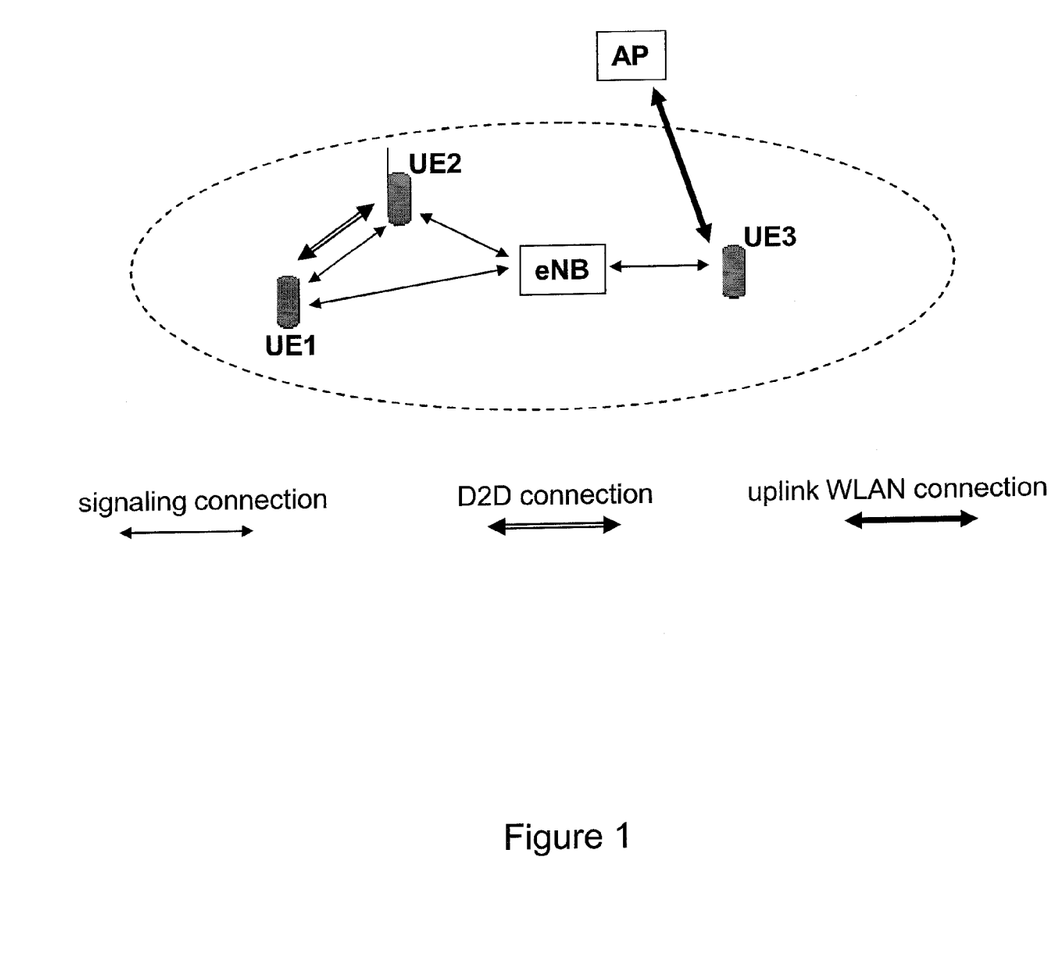
FIG. 1 shows a schematic diagram of an exemplary deployment scenario for which exemplary embodiments of the present invention are applicable.

FIG. 1 shows a schematic diagram of an exemplary deployment scenario for which exemplary embodiments of the present invention are applicable.

As shown in FIG. 1, it is exemplarily assumed that three terminal devices UE1, UE2 and UE3 reside in a cell (illustrated by a dashed line) of a cellular communication network, such s e.g. a LTE network. An eNB represents an access node or base station of the communication network, which controls the terminal devices UE1, UE2 and UE3 in its coverage area. The terminal devices UE1, UE2 and UE3 are capable of communicating via the cellular communication network, i.e. via the eNB, and via a local area network, such as a WLAN. That is, the terminal devices UE1, UE2 and UE3 may establish D2D connections or transmissions and/or uplink WLAN connections or transmissions (with a WLAN access point AP), as exemplarily illustrated in FIG. 1. Such D2D and/or uplink WLAN connections or transmissions are established and operated on an unlicensed band, e.g. of the local area network. In order to establish and operate such non-cellular connections or transmissions, signaling procedures could be performed over the illustrated signaling connections.

An unlicensed band may be located on one or more of the 2.4 GHz range, the 6 GHz range, any sub-gigahertz ISM range, and the local area network may be based on any IEEE802.11 specification (including e.g. 802.11ah, 802.11af, 802.11ac, and the like).

In the following, exemplary embodiments of the present invention are described with reference to methods, procedures and functions, as well as with reference to structural arrangements and configurations.

Figure 2:
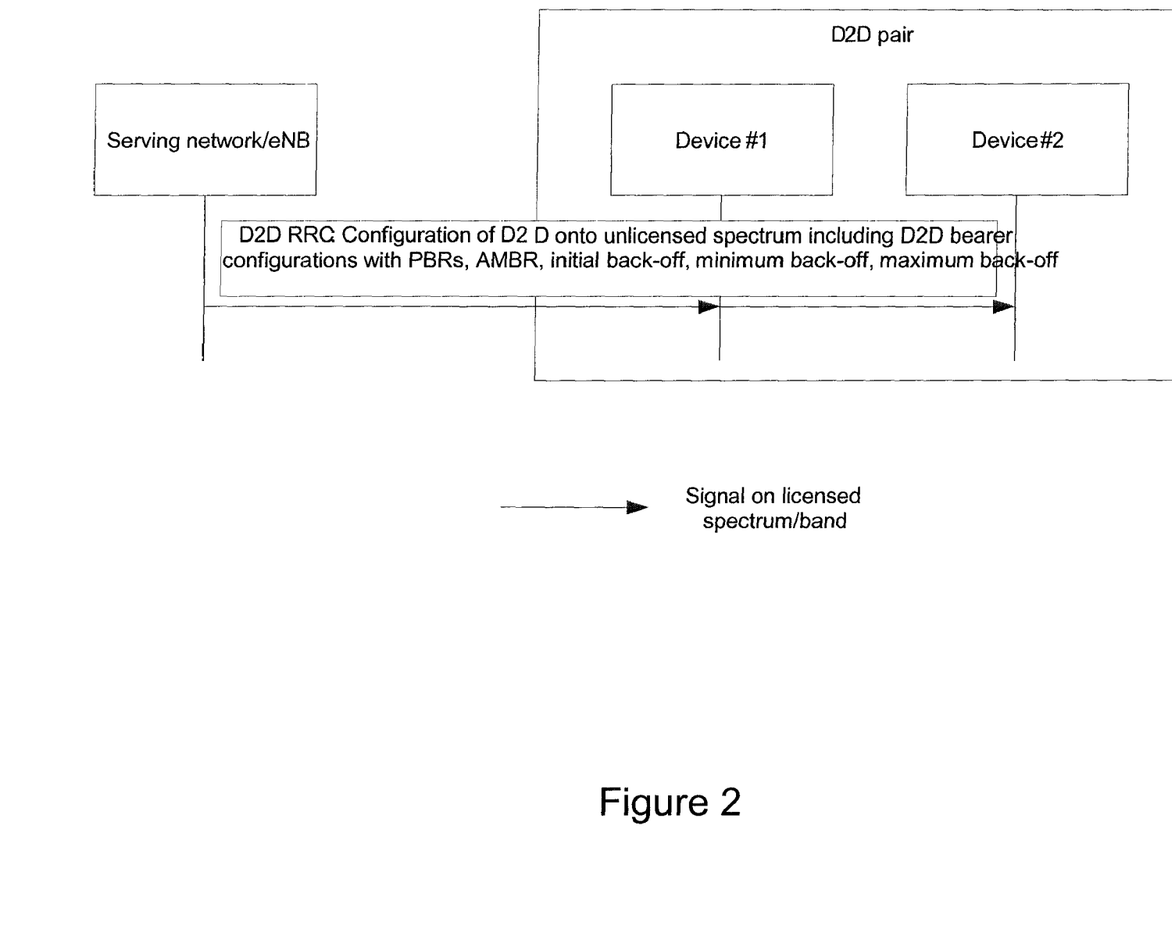
FIG. 2 shows a schematic diagram of an exemplary configuration according to exemplary embodiments of the present invention.

FIG. 2 shows a schematic diagram of an exemplary configuration according to exemplary embodiments of the present invention. In the exemplary configuration of FIG. 2, a case of a D2D communication between two devices (terminals) is assumed, such as illustrated for UE1 and UE2 in FIG. 1. The thus illustrated pair of D2D devices (terminals) could be replaced or supplemented by one or more offloading devices (terminals) dedicated for uplink offloading operations, such as illustrated for UE3 in FIG. 1.

As shown in FIG. 2, the serving network (i.e. the cellular communication network such as the LTE), in particular the access node or base station thereof (e.g. the eNB) executes a RRC configuration for the unlicensed spectrum of the local area network such as the WLAN. Such RRC configuration includes configurations of PBRs and AMBR of the configured logical channels (or respective radio bearers). PBR stands for Prioritized Bit Rate which is the data rate provided to one logical channel before allocating any transmission resource to a lower-priority logical channel. AMBR stands for Aggregated Maximum Bit Rate, which is the upper limit on the aggregate bit rate that can be expected to be provided across all logical channels (or respective bearers) having a non-guaranteed bit rate. Such RRC configuration may for example be transmitted via RRC signaling.

According to exemplary embodiments of the present invention, the serving network, in particular the access node or base station thereof, also provides (e.g. in connection with the RRC configuration) a contention window assignment including at least an assignment of a size of a contention window (also referred to as back-off window) for contention-based channel access, and the devices (terminals) receive such contention window assignment. In the example of FIG. 2, the contention window assignment includes assignments of the initial size, the minimum size and the maximum size of the contention window to be used by the two devices (terminals) for their contention-based channel access for D2D communication on the unlicensed band, respectively.

Figure 3:
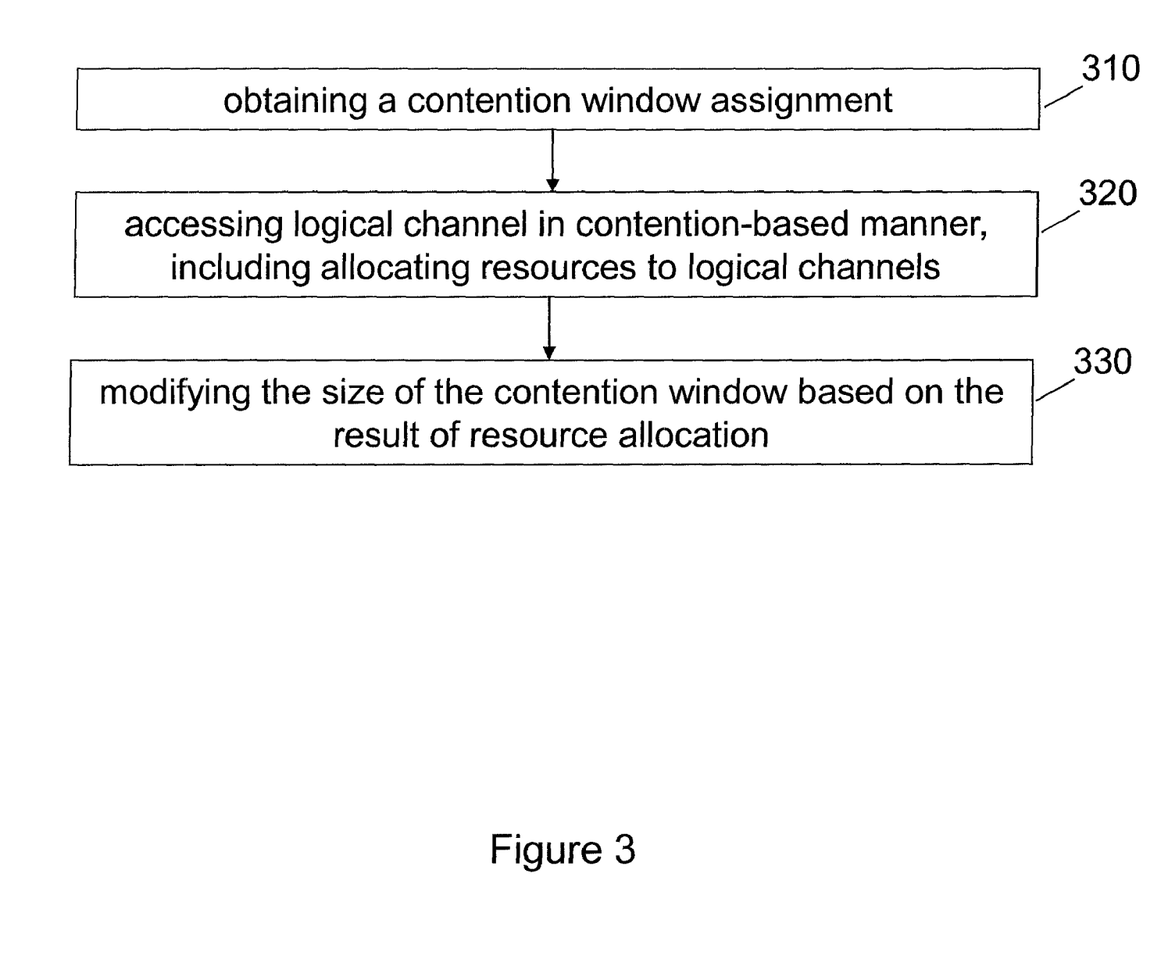
FIG. 3 shows a flowchart illustrating an example of a procedure which is operable at or by a terminal device according to exemplary embodiments of the present invention.

FIG. 3 shows a flowchart illustrating an example of a procedure which is operable at or by a terminal device according to exemplary embodiments of the present invention.

As shown in FIG. 3, a method according to exemplary embodiments of the present invention may comprise an operation of obtaining (310) a contention window assignment including at least an assignment of a size of a contention window for contention-based channel access, an operation of accessing (320) at least one logical channel in a contention-based manner according to the contention window assignment, including allocating resources to the at least one logical channel for data transmission, and an operation of modifying (330) the size of the contention window based on a result of the resource allocation in terms of an aggregated bit rate allocated for data transmission and an aggregate target bit rate requirement of prioritized bit rates of the at least one logical channel.

According to exemplary embodiments of the present invention, in the configuration of (e.g. D2D) channels or bearers onto unlicensed spectrum where channel access in predetermined resources is taking place in a contention-based manner (e.g. using CSMA, CSMA/CA, CSMA/CCA, or the like), serving the network may assign the relevant devices individual contention window characteristics. Such contention window characteristics comprise an initial size (i.e. an initial back-off window), as well as optionally device-specific minimum and maximum sizes (i.e. minimum and maximum back-off windows). Then, each device may perform (logical) channel access according to the thus provided contention window assignment, including allocation of resources to the at least one logical channel for data transmission. Once a device has performed data transmission on the thus accessed (logical) channel using the thus allocated resources, it may modify the size of the contention window based on the preceding one or more (logical) channel access and resource allocation operations. The thus modified contention window may then be used for the subsequent (logical) channel access and resource allocation operation. To this end, each device may re-calculate or update the back-off window size value according to a relation between an aggregated bit rate and an aggregate target bit rate requirement of the one or more logical channels used for the data transmission.

According to exemplary embodiments of the present invention, a contention window size modification (i.e. the re-calculation or updating of the back-off window size value) may be based on an evaluation of a relationship between a value indicative of the aggregated bit rate allocated for data transmission after the resource allocation and a value indicative of the aggregate target bit rate requirement. The value indicative of the aggregated bit rate allocated for data transmission after the resource allocation may represent an average value of hitherto aggregated bit rates in resource allocation (e.g. in MAC PDU generation), i.e. an average of a sum of aggregated bit rates of all logical channels over a number of past transmissions being considered. The value indicative of the aggregate target bit rate requirement may represent the configured aggregate target bit rate requirement which may be obtained as a sum of prioritized bit rates assigned for each logical channel, i.e. a target bit rate of all logical channels being considered.

According to exemplary embodiments of the present invention, an evaluation of the relationship of the aforementioned values may comprise, for example, a comparison of these values as such, wherein it may be evaluated whether or not (as a predetermined relationship) the value indicative of the aggregated bit rate allocated for data transmission is larger than the value indicative of the aggregate target bit rate requirement (possibly by a specified threshold amount).

According to exemplary embodiments of the present invention, an evaluation of the relationship of the aforementioned values may comprise, for example, a formation of a ratio of these values, wherein it may be evaluated whether or not (as a predetermined relationship) the ratio is larger than a specified threshold value (which may be e.g. 1 or larger than 1 for reflecting a specified threshold amount between the values).

Figure 4:
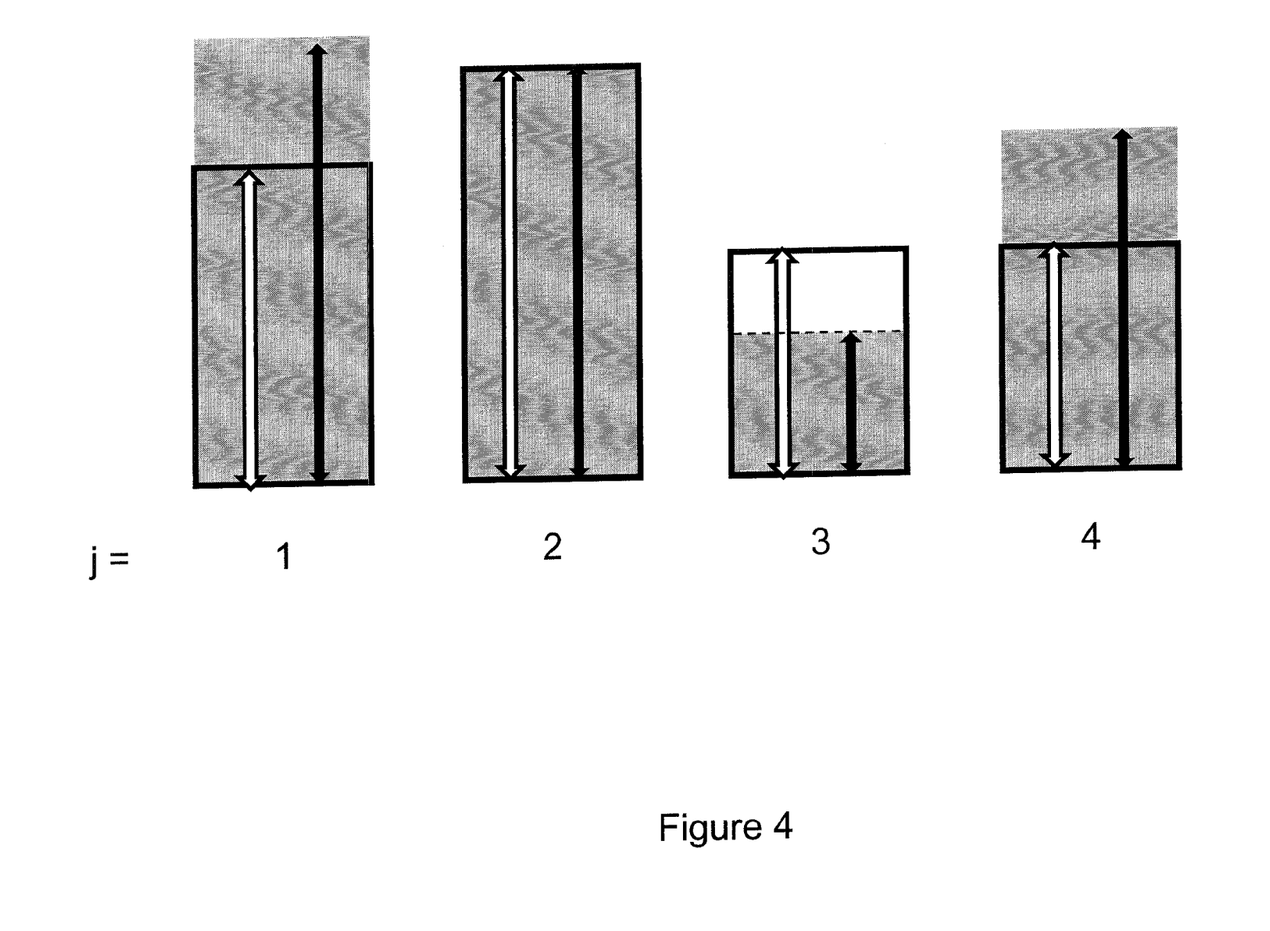
FIG. 4 shows a schematic diagram for explaining a relation between an aggregated bit rate and an aggregate target bit rate requirement according to exemplary embodiments of the present invention.

FIG. 4 shows a schematic diagram for explaining a relation between an aggregated bit rate and an aggregate target bit rate requirement according to exemplary embodiments of the present invention.

In FIG. 4, for each of a number of four logical channels (j=1.4), a PBR requirement is illustrated by a box with a thick black line, and a data amount or bit rate for transmission is illustrated by a grey square. The white block arrows indicate a target bit rate according to the PBR, and the black block arrows indicate a data amount or bit rate allocated (e.g. incorporated in a corresponding MAC PDU). In view thereof, the value indicative of the aggregated bit rate allocated for data transmission after the resource allocation may correspond to a sum of the lengths of the black block arrows in FIG. 4, and the value indicative of the aggregate target bit rate requirement may correspond to a sum of the lengths of the white block arrows in FIG. 4.

According to exemplary embodiments of the present invention, a contention window size modification (i.e. the re-calculation or updating of the back-off window size value) may comprise increasing the size of the contention window, if the value indicative of the aggregated bit rate is larger than the value indicative of the aggregate target bit rate requirement (possibly by a specified threshold amount), and decreasing the size of the contention window, if the value indicative of the aggregated bit rate is not larger than the value indicative of the aggregate target bit rate requirement (possibly by a specified threshold amount). As indicated above, the underlying evaluation may be effected by way of comparison of the values as such, by way of comparison of a ratio of the values with a specified threshold value, or the like.

Stated in other words, for example, a new back-off window value may be calculated so that, if an average value of aggregated bit rate in MAC PDU generation in past (i.e. over a predetermined number of past transmissions) is greater than the configured aggregate target bit rate by the serving network or its access node/base station, the new value shall be higher than the previous (e.g. initial) value, whereas, if the average value of aggregated bit rate in MAC PDU generation in past (i.e. over a predetermined number of past transmissions) is equal to or lower than the configured aggregate target bit rate by the serving network or its access node/base station, the new value shall be smaller than the previous (e.g. initial) value.

In addition, the updated value shall always be higher than a minimum value and lower than a maximum value. According to exemplary embodiments of the present invention, as mentioned above, the relevant minimum and maximum values may be provided by the serving network or its access node (base station in the context of the contention window assignment (e.g. in connection with the RRC configuration).

According to exemplary embodiments of the present invention, a contention window size modification, i.e. the increase/decrease of the contention window size, may be depending on various criteria. That is, the amount of increase or decrease of the contention window size may be, for example, depending on the relationship between the aforementioned indicative values (e.g. an absolute value of their difference, a difference between their ratio and 1, or the like), controlled by the (serving) network, or the like. Further, the amounts of increase or decrease may be set to be different from each other, and the amounts of increase or decrease may bet determined (based on various conceivable criteria) to be optimized in terms of channel access and/or resource allocation/sharing efficiency or the like.

Figure 5:
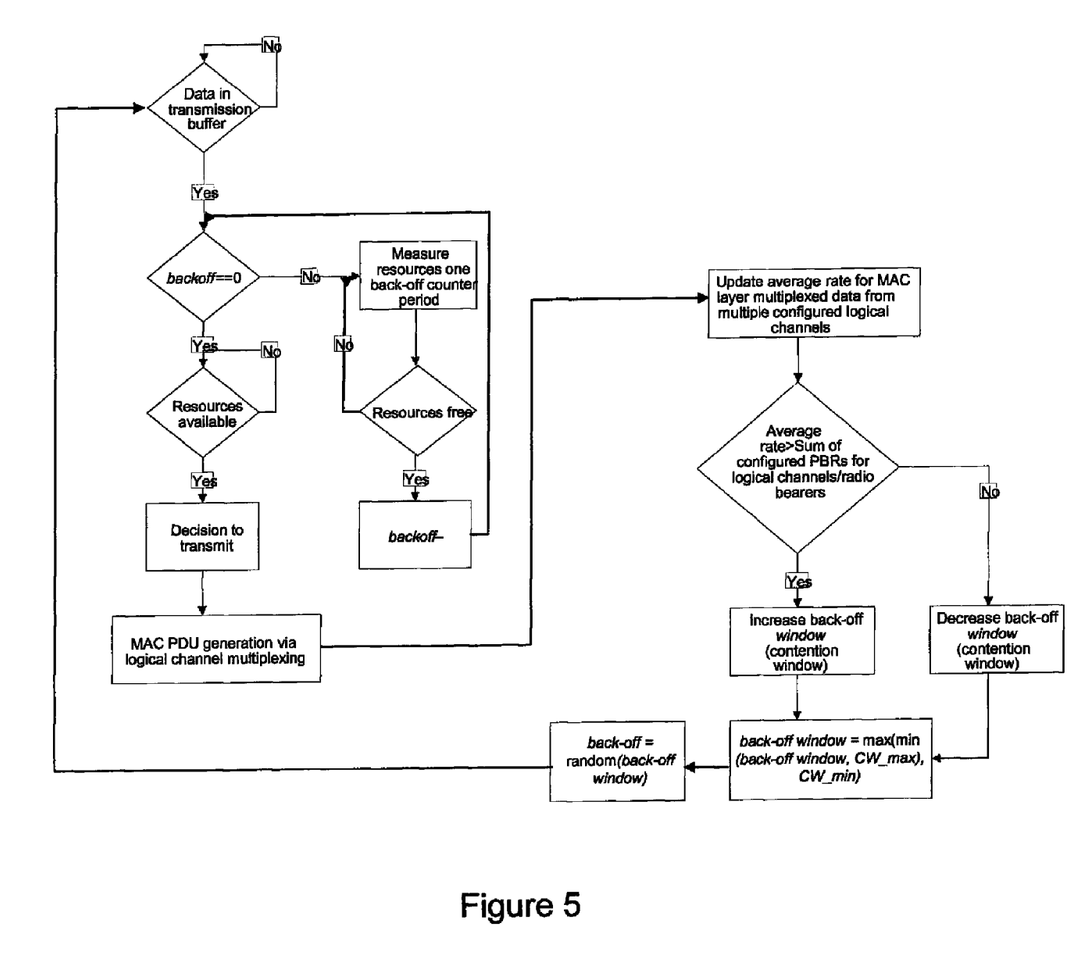
FIG. 5 shows a flowchart illustrating another example of a procedure which is operable at or by a terminal device according to exemplary embodiments of the present invention.

FIG. 5 shows a flowchart illustrating another example of a procedure which is operable at or by a terminal device according to exemplary embodiments of the present invention. In FIG. 5, a detailed flow of the above-outlined procedure is depicted. The current size of the contention window is denoted as back-off window, the minimum size of the contention window is denoted as CW_min, and the of maximum size of the contention window is denoted as CW_max.

Since the thus depicted flow is deemed to be self-explanatory and comprehensible with reference to the above explanations, a description thereof is omitted herein.

According to exemplary embodiments of the present invention, the contention window assignment may be based on a quality-of-service requirement of at least one of a logical channel to be accessed on the unlicensed band and data to be transmitted on the logical channel. In such contention window assignment, the values of the (initial) size of the contention window and, optionally, the minimum and/or maximum sizes of the contention window are assigned dependent on QoS parameters. Such QoS-based contention window assignment may be established by the serving network or its access node/base station, and used by the one or more devices (terminals) in contention-based channel access accordingly.

Figure 6:
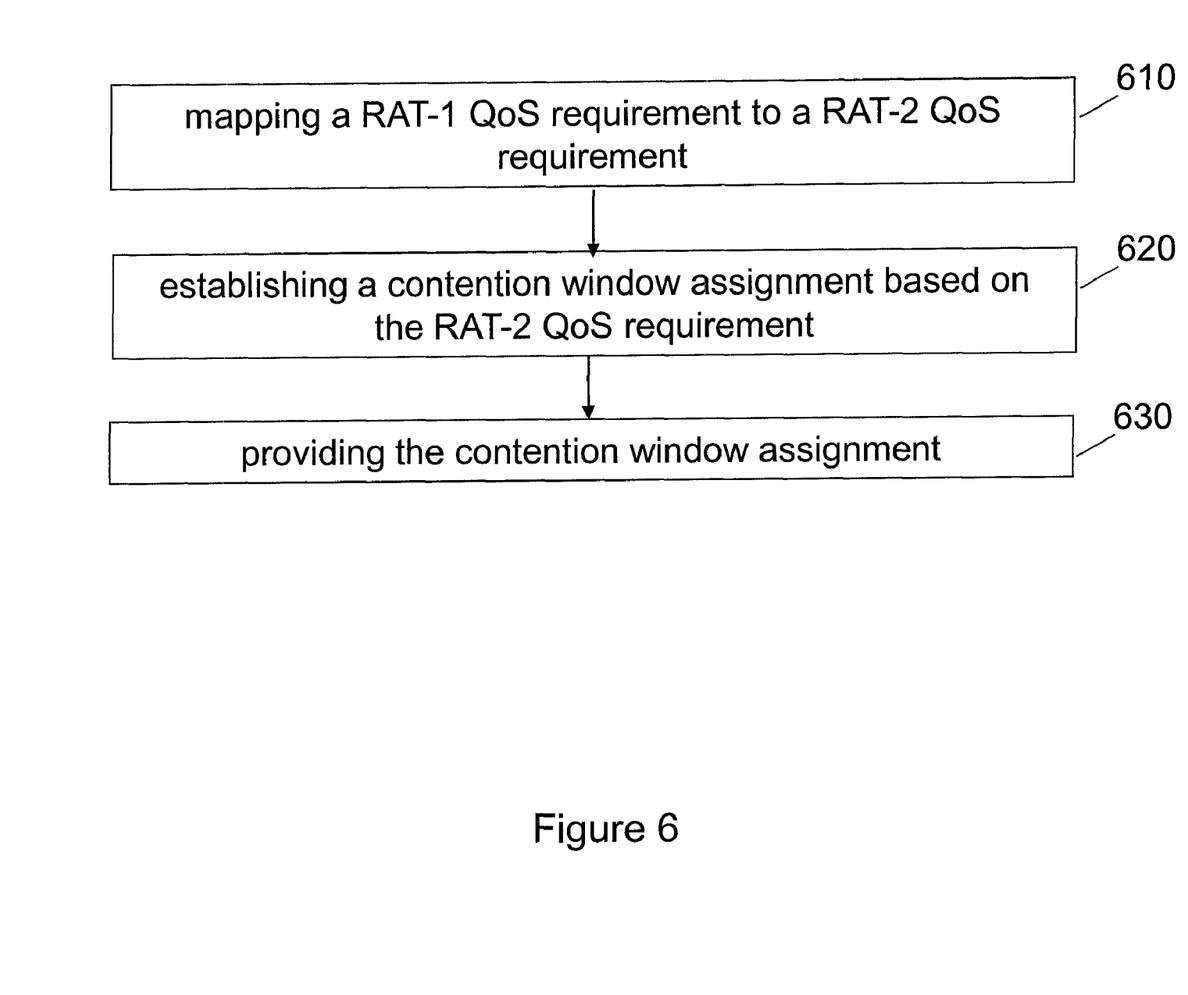
FIG. 6 shows a flowchart illustrating an example of a procedure which is operable at or by a network entity according to exemplary embodiments of the present invention.

FIG. 6 shows a flowchart illustrating an example of a procedure which is operable at or by a network entity according to exemplary embodiments of the present invention. The network entity may be an access node or base station of a serving cellular communication network, such as the eNB in FIG. 1.

As shown in FIG. 6, a method according to exemplary embodiments of the present invention may comprise an operation of mapping (610) a QoS requirement of a first radio access technology (RAT-1) to a QoS requirement of a second radio access technology (RAT-2), an operation of establishing (620) a contention window assignment based on the mapped QoS requirement of the second radio access technology (RAT-2), and an operation of providing (630) the established contention window assignment including at least an assignment of a size of a contention window for contention-based channel access to one or more devices.

According to exemplary embodiments of the present invention, the first radio access technology (RAT-1) may relate to the cellular communication network, i.e. the serving network, such as the LTE, and the second radio access technology (RAT-2) may relate to the local area network such as the WLAN. Accordingly, a logical channel to be accessed by a device (terminal) and resources usable for allocating data to be transmitted on the logical channel may be related to the second radio access technology (RAT-2), and the contention-based channel access may be performed on the second radio access technology (RAT-2).

According to exemplary embodiments of the present invention, as outlined above, the serving network of RAT-1 may configure the contention window values of RAT-2 in order to incorporate the QoS control of the RAT-1 for the RAT-2. Thereby, it may be achieved that, even if a cellular operator decides to offload traffic to an unlicensed band by way of a corresponding D2D or uplink communication, certain QoS levels may be offered for the offloaded UE or UEs, as well as, even if a cellular operator provides for network-controlled D2D on an unlicensed band in general, the certain QoS levels may be offered for the D2D UEs.

In this regard, the serving network or its access node/base station may perform a QoS requirement mapping as indicated above, by which the relevant QoS requirement/requirements from RAT-1 is/are translated to corresponding QoS requirement/requirements for RAT-2. Such mapping or translation may be based on a QoS class mapping between different RATs, which may be operator-specific. Thereby, an operator may configure specific values for the contention window assignment and, thus, the QoS in RAT-2 according to its preferred QoS class mapping between the different RATs, namely RAT-1 and RAT-2.

As an example, the case of cellular-controlled WLAN offloading may be considered, in which the network operator wants to offload traffic to an unlicensed band and to offer QoS and fairness to the offloaded devices. As mentioned above, in such case, the network may have WLAN-AP coverage on the basis of the offloaded devices may perform an uplink communication with a WLAN AP or the offloaded devices may be in a direct D2D connection.

Since cellular UEs typically have different QoS configurations configured by the cellular network for operation in cellular communication mode, the network operator may want to reflect these QoS configurations also in the WLAN offloading situation. To this end, the operator, via the access node or base station of the cellular network, may control the offloading QoS by configuring the contention window parameter values for respective offloaded WLAN stations (i.e. offloaded UEs). For example, the operator may offload traffic from UE1 and UE2 and configure UE1 and UE2 (attached to an operator's WLAN AP) by transmitting a corresponding contention (back-off) window configuration message including an appropriate contention window assignment reflecting that one of the UEs has higher priority data and/or a higher QoS/service class in cellular communication mode, respectively. Such message could for example be transmitted via RRC signaling.

The cellular network may control the QoS balance between the WLAN stations (i.e. the offloaded UEs) by setting different values for the parameters of the contention window assignment, i.e. at least initial/current window size and, optionally, minimum window size and maximum window size. Accordingly, by configuring the contention window (back-off) parameters, the cellular operator/network may configure the relative QoS between the offloaded devices according to the traffic needs, available resources and/or operator preferences, or the like.

According to exemplary embodiments of the present invention, a conflict resolving mechanism may be provided in the context of the aforementioned channel access mechanism. Thereby, a conflict in the contention-based access mechanism (due to a collision between various users transmitting on the same resources) may be detected and resolved.

Figure 7:
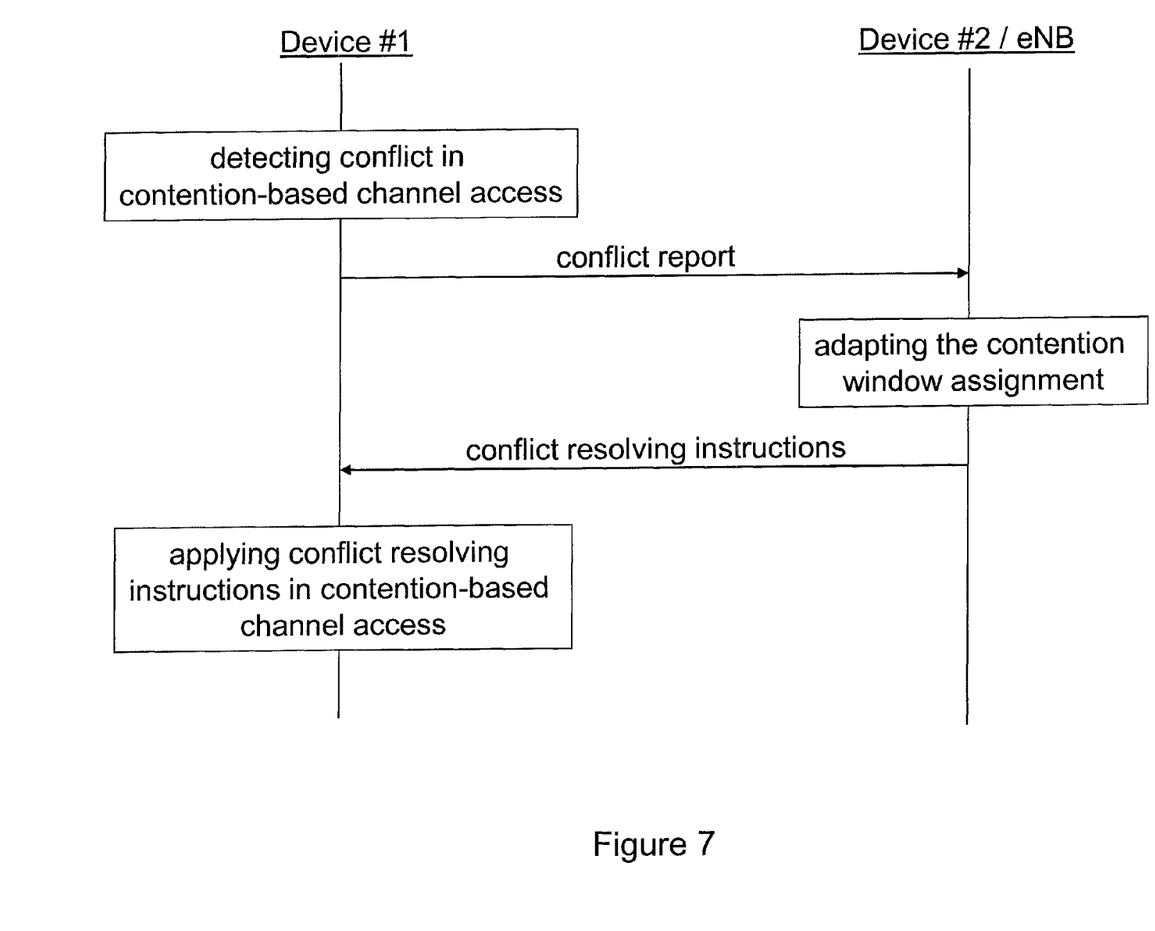
FIG. 7 shows a signaling diagram of an exemplary procedure according to exemplary embodiments of the present invention.

FIG. 7 shows a signaling diagram of an exemplary procedure according to exemplary embodiments of the present invention. In the example of FIG. 7, the two aforementioned cases of D2D communication and uplink WLAN communication are commonly considered as follows.

In both cases, a device (terminal) Device#1, e.g. an offloaded UE, may detect a conflict in contention-based channel access. Such conflict may be caused in that it is determined that the size of the contention window is to be decreased (as a result of the procedure of FIG. 3 or 5, for example), while increasing the size of the contention window would be intuitively necessary in terms of a collision or a congestion status of the resources. Additionally or alternatively, such conflict may be caused in that a predetermined amount of allocated data is discarded.

For example, in case of a collision, a procedure according to exemplary embodiments of the present invention might want to decrease the contention window size, since the average sum of logical channel bit rate will decrease due to the collision, while a typical way of handling such situation in a contention-based access mechanism would be to increase the contention window size.

When detecting such conflict, the device (terminal) Device#1 may report the detected conflict, i.e. send a corresponding report. The recipient of such report may be another device (terminal) Device#2 and/or the access node/base station eNB of the cellular network in case of D2D communication, or the access node/base station eNB of the cellular network in case in case of uplink WLAN communication. The conflict reporting may be effected at the time of detection or after a predetermined recovery timer period.

Upon receipt of the conflict report from Device#1, the recipient (Devoce#2 and/or eNB) may adapt, as conflict resolving measures, the contention window assignment based on the reported conflict. If the recipient is Device#2, it may use the adapted contention window assignment locally, i.e. apply the conflict resolving measures in a subsequent contention-based channel access. If the recipient is the eNB, it may send the adapted contention window assignment as conflict resolving measures instructions to Device#1.

Upon receipt of the resolving measures instructions, Device#1 may use the adapted contention window assignment, i.e. apply the conflict resolving measures in a subsequent contention-based channel access.

In view of the aforementioned conflict resolving mechanism, a possible problem from collisions from other users in the same resources, which may arise as a sudden increase in interference or a failed decoding attempt) may be overcome. In this regard, a timer (recovery_timer) may be used to allow for a certain period of time an overly high back-off window value (i.e. contention window size) compared to one which is required to be able to meet configured PBRs for the configured D2D logical channels. Such excessive size value may result from the fact that a procedure according to exemplary embodiments of the present invention tries to decrease the back-off window value but due to possible collisions because of too congested resource the value should actually be increased. Also, it may result from the fact that a certain amount of PDUs are discarded (the PDUs are discarded at the MAC layer when the maximum number of retransmissions is reached), e.g. when being considered in proportion to the number of successfully transmitted PDUs. Upon detecting the conflict (e.g. when the recovery timer elapses) the signaling procedure is triggered to contact e.g. the eNB concerning the detected problem/conflict. For a conflict resolution between devices, a device may broadcast a management message to other near-by users, and devices receiving this message may take appropriate actions such as reset their back-off window values to initial values and/or change the values of minimum and maximum window values, e.g. by an amount of a window_offset value (wherein this value can be positive or negative, and may be set by the network or proposed by a device in the local area network).

In view of the above, according to exemplary embodiments of the present invention, some time could be allowed, in which the contention window is too large (in terms of the aforementioned indicative values), thus sacrificing the own transmission bit rate targets, compared to one that it should be according to configured logical channel bit rates before the (D2D/offloaded) device or devices contact the eNB, e.g. for reallocation of the radio resources. In other words, the aforementioned recovery timer tries to balance the performance loss in the a connection on an unlicensed band and signaling effort between involved devices and the eNB/network.

Referring to the above, according to exemplary embodiments of the present invention, a contention window assignment, in particular a size of a contention window, for a contention-based channel access mechanism (which may be developed for a cellular (e.g. LTE) radio stack) may be derived. This may for example be based on the average value of aggregated bit rate in MAC PDU generation in the past (i.e. over a predetermined number of past transmissions) and the configured aggregate target bit rate requirement calculated as a sum of prioritized bit rates (PBR) assigned for each D2D logical channel by the network by both devices independently.

Referring to the above, according to exemplary embodiments of the present invention, resource sharing among communicating devices utilizing a CSMA-based access method but logical channel multiplexing (e.g. by LTE) in MAC PDU generation may be autonomously adjusted towards an appropriate balance, e.g. a balance required by configured QoS parameters of individual devices.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 8, while for the sake of brevity reference is made to the detailed description of respective corresponding methods and operations according to FIGS. 2, 3, and 5 to 7 as well as the underlying deployment according to FIG. 1.

Figure 8:
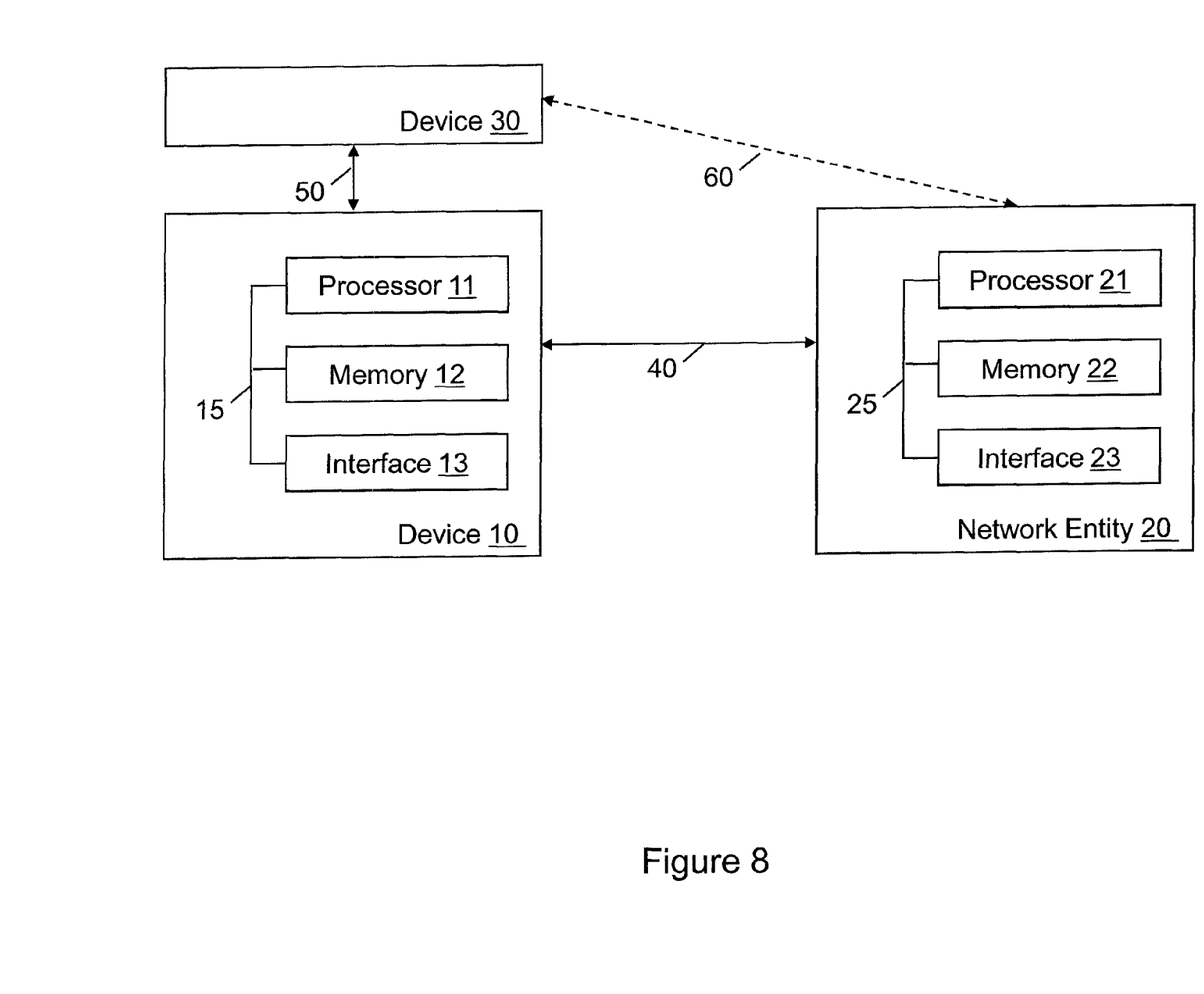
FIG. 8 shows a block diagram illustrating exemplary apparatuses according to exemplary embodiments of the present invention.

In FIG. 8 below, which is noted to represent a simplified block diagram, the solid line blocks are basically configured to perform respective operations as described above. The entirety of solid line blocks are basically configured to perform the methods and operations as described above, respectively. With respect to FIG. 8, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 8, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 8 shows a block diagram illustrating exemplary apparatuses according to exemplary embodiments of the present invention.

In view of the above, the thus described apparatuses 10 and 20 (and 30) are suitable for use in practicing the exemplary embodiments of the present invention, as described herein. The thus described apparatus 10 (and 30) may represent a (part of a) device, terminal or user equipment UE, as described above, and may be configured to perform a procedure and/or exhibit a functionality as described in conjunction with any one of FIGS. 2, 3, 6 and 7. The thus described apparatus 20 may represent a (part of a) network entity, i.e. base station or access node or controller, such as for example a NodeB, an eNB, a RNC, or the like, as described above, and may be configured to perform a procedure and/or exhibit a functionality as described in conjunction with any one of FIGS. 2, 6 and 7.

As shown in FIG. 8, according to exemplary embodiments of the present invention, a device, terminal or user equipment 10 (or 30) comprises a processor 11, a memory 12, and an interface 13, which are connected by a bus 15 or the like, and a network entity 20 comprises a processor 21, a memory 22, and an interface 23, which are connected by a bus 25 or the like. The device, terminal or user equipment 10 may be connected with the network entity 20 through a link or connection 40, the device, terminal or user equipment 10 may be connected with the device, terminal or user equipment 30 through a link or connection 50, and the device, terminal or user equipment 30 may optionally be connected with the network entity 20 through a link or connection 60.

The memories 12 and 22 may store respective programs assumed to include program instructions that, when executed by the associated processors 11 and 21, enable the respective electronic device or apparatus to operate in accordance with the exemplary embodiments of the present invention. The processors 11 and 21 and/or the interfaces 13 and 23 may also include a modem or the like to facilitate communication over the (hardwire or wireless) link 30, respectively. The interfaces 13 and 23 may include a suitable transceiver coupled to one or more antennas or communication means for (hardwire or wireless) communications with the linked or connected device(s), respectively. The interfaces 13 and 23 are generally configured to communicate with another apparatus, i.e. the interface thereof.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

According to exemplary embodiments of the present invention, the interface 13 is generally configured for communication with at least another apparatus. The processor 11 is configured to obtain, via the interface, a contention window assignment including at least an assignment of a size of a contention window for contention-based channel access, to perform accessing at least one logical channel in a contention-based manner according to the contention window assignment, including allocating resources to the at least one logical channel for data transmission, and to modify the size of the contention window based on a result of the resource allocation in terms of an aggregated bit rate allocated for data transmission and an aggregate target bit rate requirement of prioritized bit rates of the at least one logical channel.

According to exemplary embodiments of the present invention, the processor 11 may be configured to evaluate a relationship between a value indicative of the aggregated bit rate allocated for data transmission after the resource allocation and a value indicative of the aggregate target bit rate requirement, and, for contention window size modification, increase the size of the contention window, if the values are evaluated to have a predetermined relationship, and decrease the size of the contention window, if the values are evaluated to not have a predetermined relationship.

According to exemplary embodiments of the present invention, the processor 11 may be configured to detect a conflict, to report, via the interface, the detected conflict, at the time of detection or after a predetermined recovery timer period, to a device involved in the transmission or an access node of a cellular communication system, and to receive, from the device or the access node via the interface, conflict resolving instructions, and apply the received conflict resolving instructions in contention-based channel access.

According to exemplary embodiments of the present invention, the processor 11 may be configured to receive, from a device involved in the transmission via the interface, a report of a conflict in contention-based channel access, and to adapt, as conflict resolving measures, the contention window assignment based on the reported conflict, and apply the conflict resolving measures in contention-based channel access.

According to exemplary embodiments of the present invention, the processor 11 may be configured to obtain a contention window assignment based on a quality-of-service requirement of at least one of the at least one logical channel to be accessed and the data to be transmitted on the at least one logical channel, and/or to receive, via the interface, the contention window assignment from an access node of a cellular communication system, and/or to allocate the resources in a protocol data unit of medium access control.

According to exemplarily embodiments of the present invention, the processor 11, the memory 12 and the interface 13 can be implemented as individual modules, chipsets or the like, or one or more of them can be implemented as a common module, chipset or the like.

According to exemplary embodiments of the present invention, the interface 23 is generally configured for communication with at least another apparatus. The processor 21 is configured to provide, to at least one device involved in a data transmission via the interface, a contention window assignment including at least an assignment of a size of a contention window for contention-based channel access.

According to exemplary embodiments of the present invention, the processor 21 may be configured to map a quality-of-service requirement of a first radio access technology to a quality-of-service requirement of a second radio access technology, and establish the contention window assignment based on the mapped quality-of-service requirement of the second radio access technology.

According to exemplary embodiments of the present invention, the processor 21 may be configured to receive, from a device involved in the transmission via the interface, a report of a conflict in contention-based channel access, to adapt, as conflict resolving measures, the contention window assignment based on the reported conflict, and to send, to said device via the interface, the adapted contention window assignment as conflict resolving measures instructions.

According to exemplarily embodiments of the present invention, the processor 21, the memory 22 and the interface 23 can be implemented as individual modules, chipsets or the like, or one or more of them can be implemented as a common module, chipset or the like.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for channel access control. Such measures may exemplarily comprise obtaining a contention window assignment including at least an assignment of a size of a contention window for contention-based channel access, accessing at least one logical channel in a contention-based manner according to the contention window assignment, including allocating resources to the at least one logical channel for data transmission, and modifying the size of the contention window based on a result of the resource allocation in terms of an aggregated bit rate allocated for data transmission and an aggregate target bit rate requirement of prioritized bit rates of the at least one logical channel.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

| | |
|---|---|
| AMBR | aggregated maximum bit rate |
| CSMA | carrier sense multiple access |
| CSMA/CA | carrier sense multiple access with collision avoidance |
| CSMA/CCA | carrier sense multiple access with copying collision avoidance |
| D2D | device-to-device |
| eNB | evolved node B |
| IEEE | Institute of Electrical and Electronics Engineers |
| ISM | industrial scientific medical |
| LTE | long term evolution |
| MAC | medium access control |
| PBR | prioritized bit rate |
| PDU | packet data unit |
| QoS | quality of service |
| RAT | radio access technology |
| RNC | radio network controller |
| RRC | radio resource control |
| UE | user equipment |
| WLAN | wireless local area network |

What is claimed is:

1. A method comprising:
performing by an apparatus:
obtaining a contention window assignment including at least an assignment of a size of a contention window for contention-based channel access,
accessing at least one logical channel in a contention-based manner according to the contention window assignment, including allocating resources to the at least one logical channel for data transmission, and
modifying the size of the contention window based on a result of the resource allocation in terms of an aggregated bit rate allocated for data transmission and an aggregate target bit rate requirement of prioritized bit rates of the at least one logical channel.

2. The method according to claim 1, wherein
the method further comprises evaluating a relationship between a value indicative of the aggregated bit rate allocated for data transmission after the resource allocation and a value indicative of the aggregate target bit rate requirement, and
the contention window size modification comprises increasing the size of the contention window, if the values are evaluated to have a predetermined relationship, and decreasing the size of the contention window, if the values are evaluated to not have a predetermined relationship.

3. The method according to claim 2, wherein the method further comprises
detecting a conflict in that the size of the contention window is to be decreased, as the values are evaluated to not have a predetermined relationship, while increasing the size of the contention window would be necessary in terms of a congestion status of the resources, and/or a predetermined amount of allocated data is discarded,
reporting the detected conflict, at the time of detection or after a predetermined recovery timer period, to a device involved in the transmission or an access node of a cellular communication system, and
receiving, from the device or the access node, conflict resolving instructions, and applying the received conflict resolving instructions in contention-based channel access.

4. The method according to claim 2, wherein the method further comprises
receiving, from a device involved in the transmission, a report of a conflict in contention-based channel access, and
adapting, as conflict resolving measures, the contention window assignment based on the reported conflict, and applying the conflict resolving measures in contention-based channel access.

5. The method according to claim 1, wherein at least one of the following applies:
the contention window assignment is based on a quality-of-service requirement of at least one of the at least one logical channel to be accessed and the data to be transmitted on the at least one logical channel,
the contention window assignment further includes a minimum size and a maximum of the contention window, and the contention window size is modified so as to be within the range extending from the minimum size to the maximum of the contention window,
the contention window assignment is received from an access node of a cellular communication system, and
the resources are allocated in a protocol data unit of medium access control.

6. The method according to claim 1, wherein
the apparatus comprises a terminal, and
at least one of the following applies:
the data transmission is part of a device-to-device communication between terminals or an uplink communication between a terminal and an access node of a wireless local area network,
the resources are resources of an unlicensed band, and
the terminal is configured for operation in accordance with at least one of long-term evolution specifications and wireless local area network specifications.

7. An apparatus comprising
an interface configured for communication with at least another apparatus, and
a processor configured to
obtain, via the interface, a contention window assignment including at least an assignment of a size of a contention window for contention-based channel access,
perform accessing at least one logical channel in a contention-based manner according to the contention window assignment, including allocating resources to the at least one logical channel for data transmission, and
modify the size of the contention window based on a result of the resource allocation in terms of an aggregated bit rate allocated for data transmission and an aggregate target bit rate requirement of prioritized bit rates of the at least one logical channel.

8. The apparatus according to claim 7, wherein
the processor is further configured to evaluate a relationship between a value indicative of the aggregated bit rate allocated for data transmission after the resource allocation and a value indicative of the aggregate target bit rate requirement, and
the processor is further configured to, for contention window size modification, increase the size of the contention window, if the values are evaluated to have a predetermined relationship, and decrease the size of the contention window, if the values are evaluated to not have a predetermined relationship.

9. The apparatus according to claim 8, wherein the processor is further configured to
detect a conflict in that the size of the contention window is to be decreased, as the values are evaluated to not have a predetermined relationship, while increasing the size of the contention window would be necessary in terms of a congestion status of the resources, and/or a predetermined amount of allocated data is discarded,
report, via the interface, the detected conflict, at the time of detection or after a predetermined recovery timer period, to a device involved in the transmission or an access node of a cellular communication system, and
receive, from the device or the access node via the interface, conflict resolving instructions, and apply the received conflict resolving instructions in contention-based channel access.

10. The apparatus according to claim 8, wherein the processor is further configured to
receive, from a device involved in the transmission via the interface, a report of a conflict in contention-based channel access, and
adapt, as conflict resolving measures, the contention window assignment based on the reported conflict, and apply the conflict resolving measures in contention-based channel access.

11. The apparatus according to claim 7, wherein at least one of the following applies:
the contention window assignment is based on a quality-of-service requirement of at least one of the at least one logical channel to be accessed and the data to be transmitted on the at least one logical channel,
the contention window assignment further includes a minimum size and a maximum of the contention window, and the processor is further configured to modify the contention window size so as to be within the range extending from the minimum size to the maximum of the contention window,
the processor is further configured to receive, via the interface, the contention window assignment from an access node of a cellular communication system, and
the processor is further configured to allocate the resources in a protocol data unit of medium access control.

12. The apparatus according to claim 7, wherein
the apparatus is operable as or at a terminal, and
at least one of the following applies:
the data transmission is part of a device-to-device communication between terminals or an uplink communication between a terminal and an access node of a wireless local area network,
the resources are resources of an unlicensed band, and
the apparatus is configured for operation in accordance with at least one of long-term evolution specifications and wireless local area network specifications.

13. A computer-readable storage medium tangibly embodying a computer program comprising computer-executable components which, when the program is run on a computer, are configured to cause an apparatus comprising the computer and the computer-readable storage medium to:
obtain a contention window assignment including at least an assignment of a size of a contention window for contention-based channel access,
access at least one logical channel in a contention-based manner according to the contention window assignment, including allocating resources to the at least one logical channel for data transmission, and
modify the size of the contention window based on a result of the resource allocation in terms of an aggregated bit rate allocated for data transmission and an aggregate target bit rate requirement of prioritized bit rates of the at least one logical channel.

* * * * *